(12) United States Patent
Bito et al.

(10) Patent No.: US 7,763,378 B2
(45) Date of Patent: Jul. 27, 2010

(54) CYLINDRICAL CELL AND MANUFACTURING METHOD THEREOF

(75) Inventors: Seiji Bito, Fujisawa (JP); Satoshi Yoneyama, Hiratsuka (JP); Masahiko Kato, Chigasaki (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 10/569,599

(22) PCT Filed: Aug. 23, 2004

(86) PCT No.: PCT/JP2004/012432

§ 371 (c)(1),
(2), (4) Date: Feb. 24, 2006

(87) PCT Pub. No.: WO2005/020351

PCT Pub. Date: Mar. 3, 2005

(65) Prior Publication Data

US 2007/0020518 A1    Jan. 25, 2007

(30) Foreign Application Priority Data

Aug. 25, 2003  (JP) .............................. 2003-299598
Jul. 16, 2004  (JP) .............................. 2004-210190

(51) Int. Cl.
    H01M 2/02    (2006.01)
    H01M 2/26    (2006.01)
    H01M 2/28    (2006.01)
    H01M 4/00    (2006.01)
    H01M 4/02    (2006.01)
    H01M 4/82    (2006.01)
    H01M 6/00    (2006.01)
    H01M 6/10    (2006.01)

(52) U.S. Cl. .................... 429/161; 429/94; 429/181; 429/211; 29/623.2; 29/623.4

(58) Field of Classification Search .................... 219/93; 429/94, 181, 211, 161; 29/623.2, 623.4
See application file for complete search history.

(56) References Cited

U.S. PATENT DOCUMENTS 4,909,807 A * 3/1990 Klink et al. ................ 29/623.2

(Continued)

FOREIGN PATENT DOCUMENTS

JP    11-031497    2/1999

(Continued)

OTHER PUBLICATIONS

English Language Abstract of JP 2000-106165.

(Continued)

Primary Examiner—Gregg Cantelmo
Assistant Examiner—Eugenia Wang
(74) Attorney, Agent, or Firm—Greenblum & Bernstein, P.L.C.

(57) ABSTRACT

A cylindrical battery includes an electrode plate assembly, a positive electrode collector welded to a projecting portion of a core material for a positive electrode plate and a negative electrode collector having a plurality of projections at its lower surface. The negative electrode collector is also welded to a projecting portion of a core material for a negative electrode plate at its upper surface. The cylindrical battery further includes a metal case for accommodating the electrode plate assembly. The projections of the negative electrode collector are welded to an inner bottom surface of the metal case. The projections of the negative electrode collector are arranged at a plurality of locations in a region between a portion opposed to a hollow cylindrical portion of the electrode plate assembly and a peripheral portion.

4 Claims, 9 Drawing Sheets

U.S. PATENT DOCUMENTS

| | | | |
|---|---|---|---|
| 5,521,349 A * | 5/1996 | Okamoto et al. ............... 219/93 |
| 6,027,529 A * | 2/2000 | Roychowdhury et al. .. 623/1.53 |
| 6,835,501 B2 | 12/2004 | Morishita et al. |
| 2004/0048147 A1 | 3/2004 | Muraoka et al. |
| 2005/0123824 A1 | 6/2005 | Ishikawa et al. |

FOREIGN PATENT DOCUMENTS

| | | | |
|---|---|---|---|
| JP | 2000058024 A * | 2/2000 |
| JP | 2000-106165 | 4/2000 |
| JP | 2000-268850 | 9/2000 |
| JP | 2002-134095 | 5/2002 |
| JP | 2004-055371 | 2/2004 |

OTHER PUBLICATIONS

English Language Abstract of JP 2002-134095.
English Language Abstract of JP 2000-268850.
English Language Abstract of JP 2004-055371.
English Language Abstract of JP 11-031497.

* cited by examiner

PRIOR ART

CYLINDRICAL CELL AND MANUFACTURING METHOD THEREOF

TECHNICAL FIELD

The present invention relates to a cylindrical battery including an electrode plate assembly that is spirally wound and a method for manufacturing that cylindrical battery.

BACKGROUND ART

There are various types of cylindrical batteries that are typified by a nickel-cadmium battery and a nickel metal hydride battery. Those cylindrical batteries are widely used in various applications, for example, as a power source for a cellular phone or a notebook computer, because they have high reliability and maintenance is easy. In recent years, development of cylindrical batteries suitable for large current discharge as a power source for an electric-assist bicycle, a lawnmower, and an electric vehicle has been demanded.

The cylindrical battery for a large current is formed by accommodating an electrode plate assembly in a metal battery case. The electrode plate assembly is formed by spirally winding a strip-like positive electrode plate and a strip-like negative electrode plate that are stacked with a separator interposed therebetween, which separates those electrode plates from each other. In a collecting structure suitable for inputting and outputting a large current, a positive electrode collector is welded at a plurality of locations to an end of the positive electrode plate projecting from an upper end face of the electrode plate assembly, and a negative electrode collector is welded at a plurality of locations to an end of the negative electrode plate projecting from a lower end face of the electrode plate assembly. The positive electrode collector includes a through hole formed at its center. The negative electrode collector 21 has a tongue-like connection piece 22 at its center, as shown in FIG. 12. The tongue-like connection piece 22 is formed by cutting. The electrode plate assembly to which those positive and negative electrode collectors are welded is accommodated in the metal case in such a manner that the negative electrode collector is arranged down. The positive electrode collector is connected to a sealing board via a connection lead. The negative electrode collector and the metal case are welded to each other by resistance welding. More specifically, the resistance welding is performed by making a welding current flow between a welding electrode bar inserted into the through hole of the positive electrode collector and a hollow cylindrical portion of the electrode plate assembly and a welding electrode arranged to be in contact with the bottom of the metal case, while the tongue-like connection piece 22 of the negative electrode collector and the inner bottom surface of the metal case are sandwiched and pressed between the welding electrode bar and the welding electrode.

Moreover, a structure is known, in which a contact concave portion projecting downward is formed at the center of the negative electrode collector and a protrusion for welding that protrudes inwardly is formed on the bottom of the metal case. Spot welding between the negative electrode collector and the metal case can be well performed by bringing the protrusion for welding and a lower surface of the contact concave portion into contact with each other (see Japanese Patent Laid-Open Publication No. 2000-106165, for example).

However, the aforementioned conventional structure has a problem that contact resistance between the metal case and the negative electrode collector is high because the metal case and the collector are connected to each other at one welding point. For example, when discharge is performed at a large current, e.g., 100 A, a voltage of the battery rapidly drops because of the high resistance at the portion where the metal case and the negative electrode collector are welded to each other. Moreover, when the tongue-like connection piece 22 is welded to the metal case, as shown in FIG. 12, resistance of the tongue-like connection piece 22 during the flow of current is large. Therefore, the tongue-like connection piece 22 may be melted and broken when a large current flows therethrough. When the protrusion for welding formed at the center of the bottom of the metal case is welded to the negative electrode collector, as disclosed in Japanese Patent Laid-Open Publication No. 2000-106165, an internal pressure of the battery increases because of overcharge or the like and causes expansion of the bottom of the metal case. Accordingly, deformation of the negative electrode collector occurs. This deformation may cause peeling of the negative electrode collector from the negative electrode plate. Thus, there is a possibility to increase in the battery resistance.

It is therefore an object of the present invention to provide a cylindrical battery and a method for manufacturing the cylindrical battery, which realizes low connection resistance between a metal case and a collector, suppresses voltage drop when large current discharge is performed, and suppresses deformation of the collector and ensure stable connection with the collector even when an internal pressure of the battery rises.

SUMMARY OF THE INVENTION

A method for manufacturing a cylindrical battery of the present invention comprises the steps of: forming an electrode plate assembly by spirally winding a positive electrode plate and a negative electrode plate with a separator interposed therebetween in such a manner that core materials of the positive and negative electrode plates project to opposite sides to each other in a width direction of the positive and negative electrode plates; welding a collector to a projecting portion of one of the core materials of the electrode plate assembly; forming surrounding projections projecting downward on another collector at a plurality of locations in a region between a portion opposed to a hollow cylindrical portion of the electrode plate assembly and a peripheral portion, and forming a central projection having lower height than the surrounding projections on the other collector at the portion opposed to the hollow cylindrical portion; welding an upper surface of the other collector to a projecting portion of the other core material of the electrode plate assembly; accommodating the electrode plate assembly in a metal case; welding the plurality of projections of the other collector and the metal case to each other; pouring an electrolyte into the metal case; and sealing a top of the metal case with a sealing member having a cap that also serves as an input and output terminal, while the sealing member is electrically insulated from the metal case, wherein, in the step of welding the plurality of projections of the other collector and the metal case to each other, the electrode plate assembly and the metal case are brought into close contact with each other by application of a pressure, and resistance welding is performed using a welding electrode bar inserted into the hollow cylindrical portion of the electrode plate assembly and a welding electrode brought into contact with a bottom of the metal case.

In this structure, a welding current flows between the surrounding projections and the bottom of the metal case in an initial stage of welding. Thus, top ends of the surrounding projections are melted to some extent and the heights of the surrounding projections become lower. When the heights of the surrounding projections become equal to that of the central projection, the welding current begins to flow through all the projections approximately evenly. Thus, all the projections are evenly welded to the bottom of the metal case. As a result, connection resistance is reduced because the metal case and the other collector welded to the electrode plate assembly are connected to each other at a plurality of locations via the surrounding projections provided on the other collector in the region between the portion opposed to the hollow cylindrical portion of the electrode plate assembly and the peripheral portion and the central projection provided at the position opposed to the hollow cylindrical portion. This reduction in connection resistance reduces internal resistance of the battery. Thus, it is possible to eliminate a possibility that, when large current discharge is performed, a connected portion is welded and broken or voltage drops occurs. Therefore, the cylindrical battery capable of performing high-rate charge and discharge is manufactured. Moreover, since the bottom of the metal case and the other collector are integrally connected as one unit by welding at a plurality of locations, the rigidity is increased. Thus, deformation of the bottom of the metal case and deformation of the collector are suppressed and stable connection is ensured, even when an internal pressure of the battery increases. Therefore, it is possible to manufacture the cylindrical battery that stably keeps the battery performance.

Even if the heights of the surrounding projections are equal to that of the central projection, when a ring-like welding electrode is used, the surrounding projections are first welded by resistance welding and thereafter the central projection is welded by resistance welding. Thus, it is possible to evenly weld all the projections by resistance welding and realize the same operation and effects as those described above.

Another method for manufacturing a cylindrical battery of the present invention comprises the steps of: forming an electrode plate assembly by spirally winding a positive electrode plate and a negative electrode plate with a separator interposed therebetween in such a manner that core materials of the positive and negative electrode plates project to opposite sides to each other in a width direction of the positive and negative electrode plates; welding a collector to a projecting portion of one of the core materials of the electrode plate assembly; welding another collector to a projecting portion of the other core material of the electrode plate assembly; forming surrounding projections projecting inwardly on a bottom of a metal case at a plurality of locations in a region between a portion opposed to a hollow cylindrical portion of the electrode plate assembly and a peripheral portion, and forming a central portion having lower height than the surrounding projections on the bottom of the metal case at the portion corresponding to the hollow cylindrical portion; accommodating the electrode plate assembly in the metal case; welding the other collector and a plurality of projections of the metal case to each other; pouring an electrolyte into the metal case; and sealing a top of the metal case with a sealing member including a cap that also serves as an input and output terminal, while the metal case and the sealing member are electrically insulated from each other, wherein, in the step of welding the plurality of projections of the metal case and the other collector to each other, the electrode plate assembly and the metal case are brought into close contact with each other by application of a pressure, and resistance welding is performed using a welding electrode bar inserted into the hollow cylindrical portion of the electrode plate assembly and a welding electrode brought into contact with the bottom of the metal case.

As described above, when the surrounding and central projections are provided on the bottom of the metal case, instead of on the other collector, the same operation and effects as those described above are also realized because welding is performed in the same manner.

Moreover, even if the heights of the surrounding projections are equal to that of the central projection, when a ring-like welding electrode is used, the surrounding projections are first welded by resistance welding and thereafter the central projection is welded by resistance welding. Thus, it is possible to evenly weld all the projections by resistance welding and realize the same operation and effects as those described above.

BEST MODE FOR CARRYING OUT THE INVENTION

Embodiment 1

First, a cylindrical battery and a method for manufacturing the same according to a first embodiment of the present invention are described, with reference to FIGS. 1 to 7.

Figure 1:
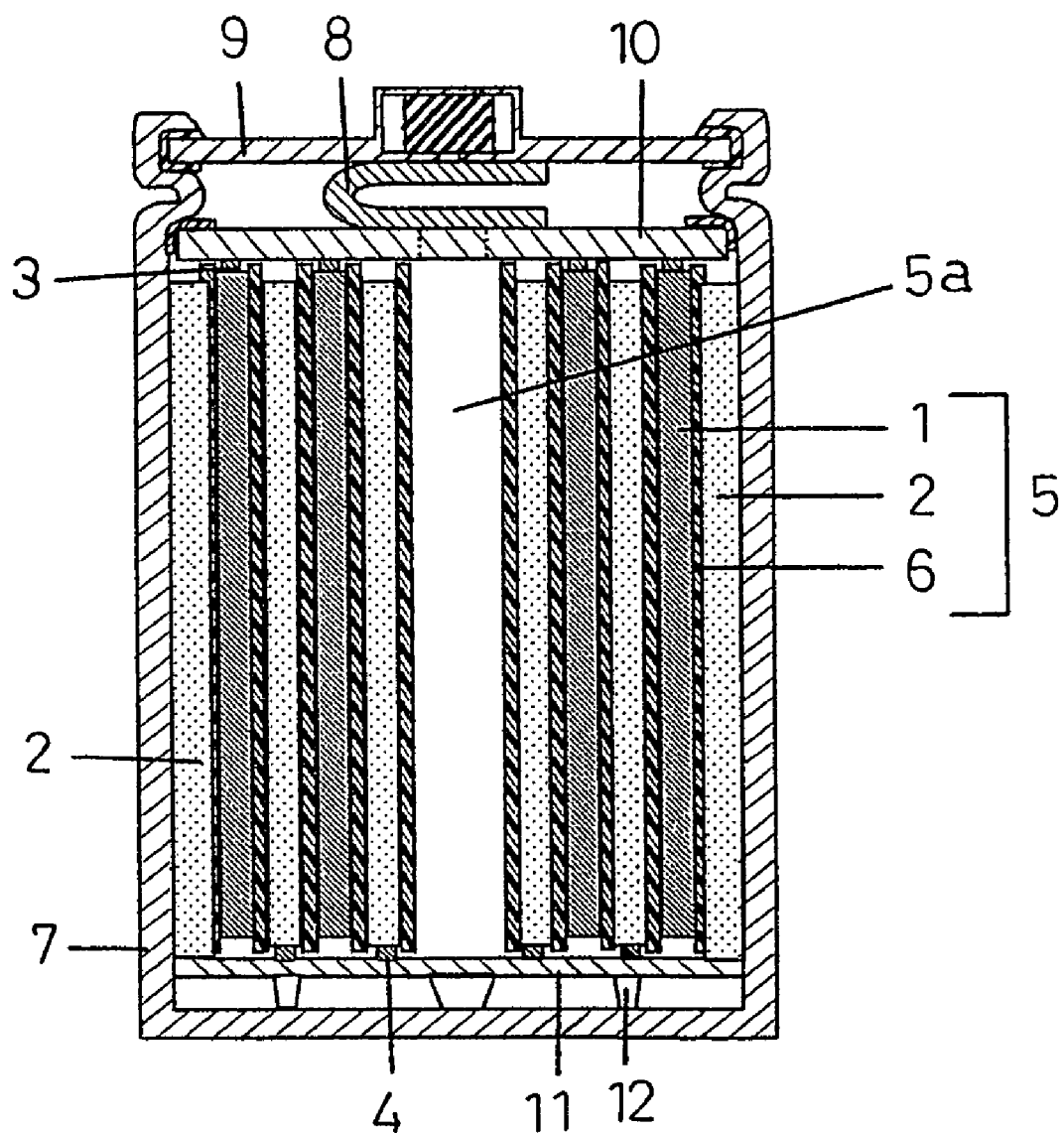
FIG. 1 is a longitudinal cross-sectional view of a cylindrical rechargeable battery according to a first embodiment of the present invention.

FIG. 1 is a cross-sectional view schematically showing the cylindrical battery of the present embodiment. In FIG. 1, an electrode plate assembly 5 of the cylindrical battery is formed by spirally winding a strip-like positive electrode plate 1 and a strip-like negative electrode plate 2 that are stacked with a strip-like separator 6 interposed therebetween. A core material 3 of the positive electrode plate 1 projects upward from the electrode plate assembly 5. A core material 4 of the negative electrode plate 2 projects downward from the electrode plate assembly 5. A positive electrode collector 10 is welded to a projecting portion of the core material 3 of the positive electrode plate 1, which projects upward from the electrode plate assembly 5. A negative electrode collector 11 is welded to a projecting portion of the core material 4 of the negative electrode plate 2, which projects downward from the electrode plate assembly 5.

The electrode plate assembly 5 to which those collectors 10 and 11 are welded is accommodated in a metal case 7 that also serves as an input and output terminal for a negative electrode. An opening at an upper end of the metal case 7 is sealed with a sealing member 9 electrically insulated from the metal case 7. The sealing member 9 includes a cap serving as a terminal for a positive electrode in an upper part. A connection lead 8 connects the sealing member 9 and the positive electrode collector 10 to each other. The negative electrode collector 11 and the metal case 7 are connected to each other by welding a plurality of projections 12 provided on a lower surface of the negative electrode collector 11 to an inner bottom surface of the metal case 7.

Figure 2:
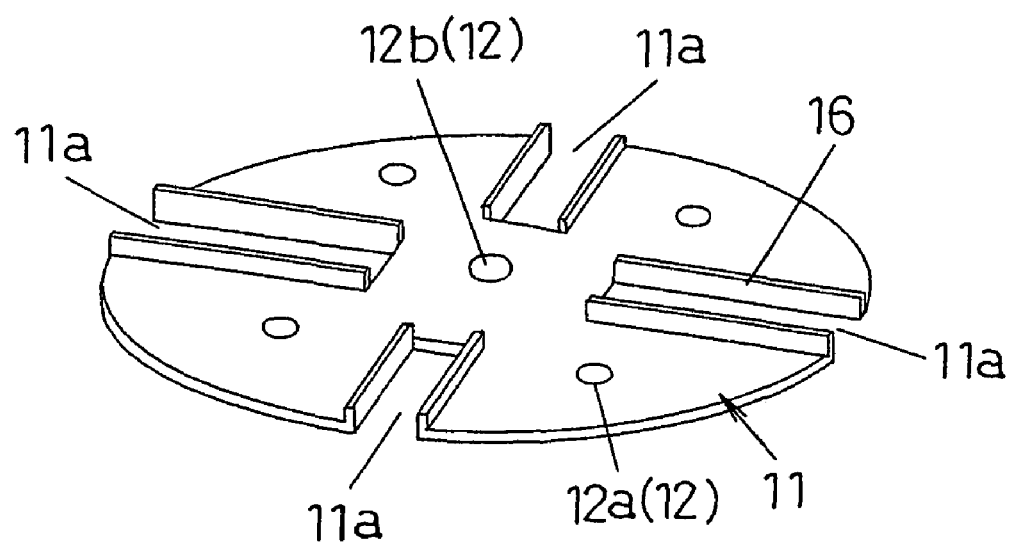
FIG. 2 is a perspective view of a negative electrode collector in the first embodiment.
Figure 3:
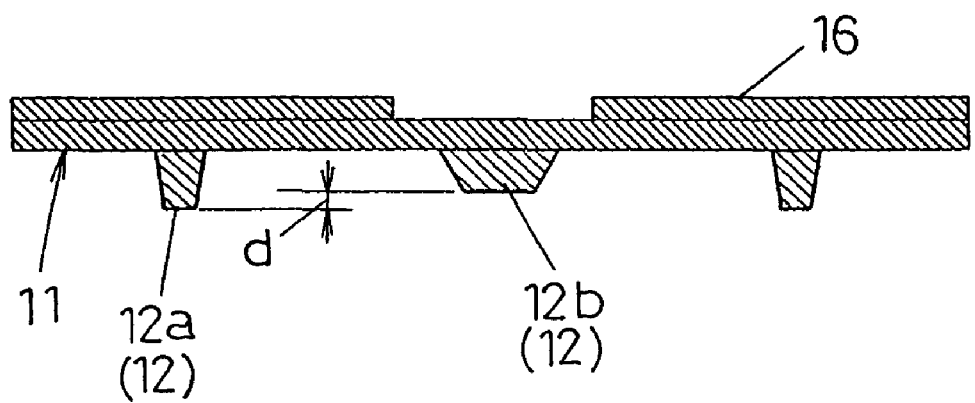
FIG. 3 is a transverse cross-sectional view of the negative electrode collector in the first embodiment.

FIG. 2 is a perspective view of the negative electrode collector 11, and FIG. 3 is a transverse cross-sectional view thereof. In FIGS. 2 and 3, a plurality of (four in the shown example) projections 12a (12) are provided in a region between the center of the negative electrode collector 11 and a peripheral portion thereof. Moreover, one projection 12b (12) is provided at the center of the negative electrode collector 11. The projections 12a are arranged on the same circle at a regular angular interval (an interval of 90 degrees in the shown example). Before welding of the projections 12a and 12b to the inner bottom surface of the metal case 7, the height of the central projection 12b is set to be lower than those of the projections 12a concentrically arranged. A height difference d between the projection 12b and the projections 12a is set to be about 100 to about 500 μm, for example.

In FIG. 2, the reference numeral 16 denotes a burring portion that projects upward from both side ends of each of a plurality (four in the shown example) of slits 11a formed in the negative electrode collector 11 in a radial pattern. It is possible to connect the negative electrode plate 2 and the negative electrode collector 11 to each other with low resistance by performing welding while the burring portions 16 bite into the projecting portion of the core material 4 of the negative electrode plate 2 of the electrode plate assembly 5.

Next, a manufacturing process of the cylindrical battery having the above structure is described. First, the electrode plate assembly 5 is formed in the aforementioned manner. Then, the positive electrode collector 10 is welded to the projecting portion of the core material 3 of the positive electrode plate 1 of the electrode plate assembly 5. The projections 12a projecting downward are formed on the negative electrode collector 11 at a plurality of locations in a region between the center and the peripheral portion. The projection 12b is also formed at the center of the negative electrode collector 11. Note that the center of the negative electrode collector 11 is opposed to a hollow cylindrical portion 5a of the electrode plate assembly 5. Then, an upper surface of the negative electrode collector 11 is welded to the projecting portion of the core material 4 of the negative electrode plate 2 of the electrode plate assembly 5. The electrode plate assembly 5 is then accommodated in the metal case 7 and thereafter the projections 12a and 12b of the negative electrode collector 11 are welded to the bottom of the metal case 7. Subsequently, electrolyte is poured into the metal case 7. Then, a top of the metal case 7 is sealed with the sealing member 9 including the cap that also serves as the input and output terminal, while the metal case 7 and the sealing member 9 are electrically insulated from each other. In this manner, the cylindrical battery is manufactured.

Figure 4:
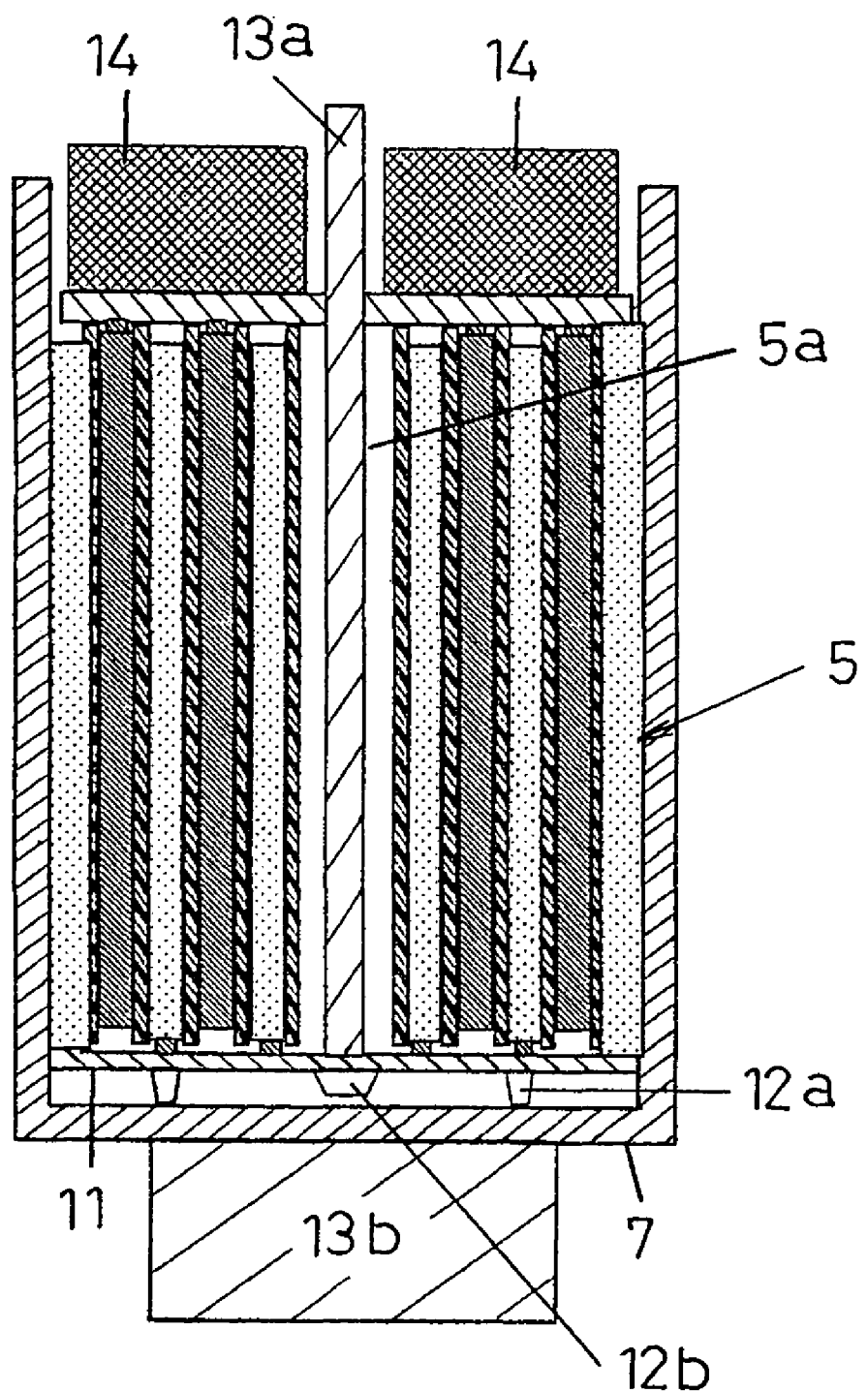
FIG. 4 is a longitudinal cross-sectional view showing a resistance welding process for welding a metal case and the negative electrode collector to each other in the first embodiment.

The process for welding the projections 12a and 12b of the negative electrode collector 11 to the bottom of the metal case 7 is described in detail, with reference to FIG. 4. In FIG. 4, a pressure is applied to the electrode plate assembly 5 by a pressing machine 14 with a required pressing force, thereby bringing the electrode plate assembly 5 into close contact with the inner bottom surface of the metal case 7. A welding electrode bar 13a is inserted into a through hole formed at the center of the positive electrode collector 10 and the hollow cylindrical portion 5a of the electrode plate assembly 5. One end of the welding electrode bar 13a is pressed against the center of the negative electrode collector 11 to be in contact with the center of the negative electrode collector 11. Moreover, a welding electrode 13b is arranged to be in contact with the bottom of the metal case 7. In this state, a welding current is made to flow between the welding electrode bar 13a and the welding electrode 13b, thereby welding the plurality of projections 12a and 12b of the negative electrode collector 11 to the inner bottom surface of the metal case 7 by resistance welding.

Since the height of the central projection 12b, which is located just below the welding electrode bar 13a and on which the pressing force directly acts and the welding current easily concentrates, is set to be lower than those of the plurality of surrounding projections 12a, the welding current first flows between the plurality of surrounding projections 12a and the bottom of the metal case 7 in an initial stage of the above welding process. Therefore, top ends of the projections 12a are melted and welded to some extent, making resistance of the projections 12a during the flow of current smaller and reducing the heights of the projections 12a. Then, the welding current begins to flow through all the projections 12a and 12b approximately evenly at a time when the heights of the projections 12a become equal to that of the central projection 12b. Thus, it is possible to prevent concentration of the welding current on the central projection 12b only and insufficient welding of the plurality of surrounding projections 12a. That is, all the projections 12a and 12b are evenly welded to the bottom of the metal case 7. In order to surely realize the above operation, it is preferable that each of the plurality of surrounding projections 12a taper down to a point in such a manner that its top end will be melted relatively easily to reduce its height.

Figure 5:
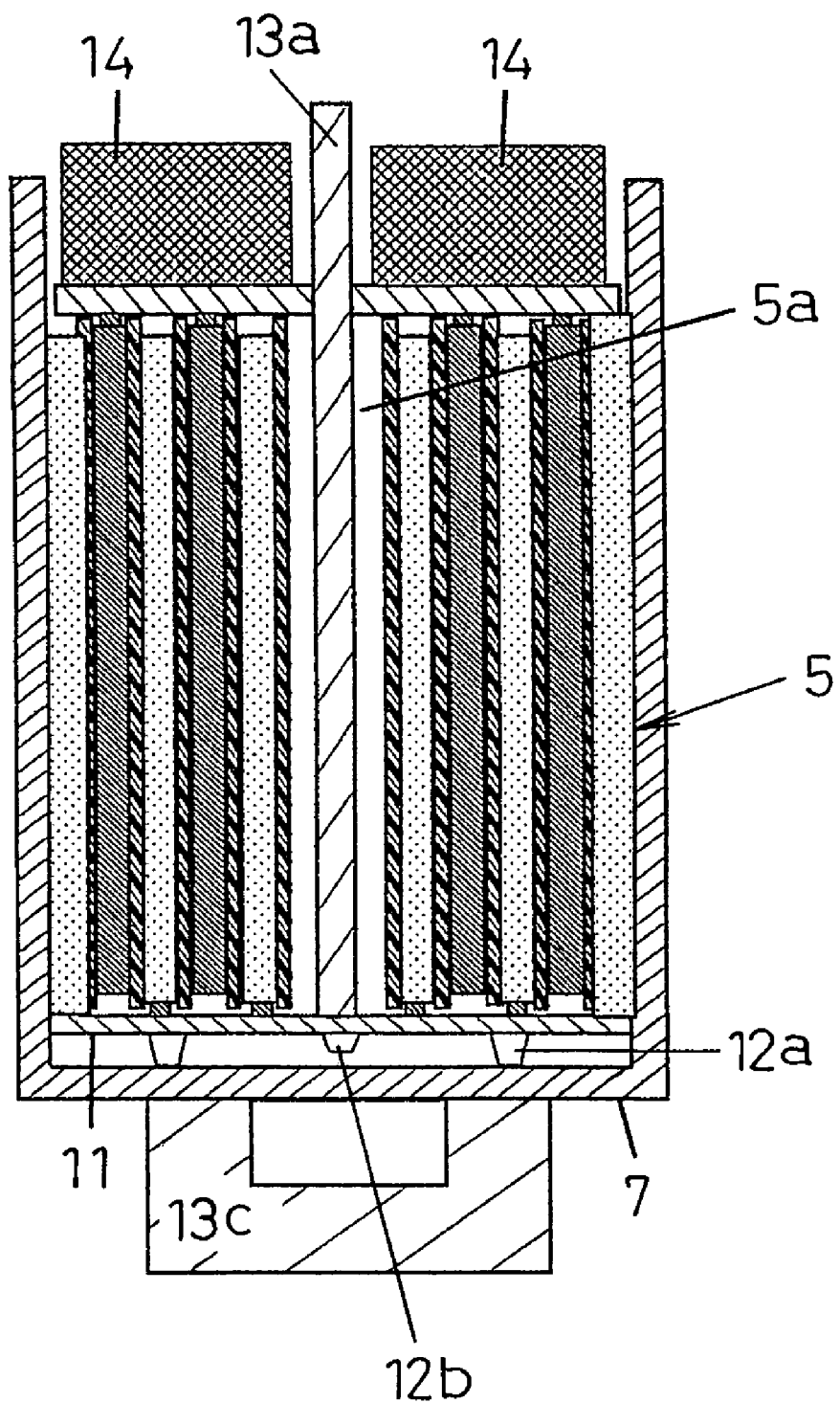
FIG. 5 is a longitudinal cross-sectional view showing another resistance welding process for welding the metal case and the negative electrode collector to each other in the first embodiment.

Alternatively, a welding electrode 13c that contacts with the bottom of the metal case 7 in the form of a ring may be used as the welding electrode to be brought into contact with the bottom of the metal case 7, as shown in FIG. 5. When this type of welding electrode 13c is used, it is possible to prevent the projection 12b and the bottom of the metal case 7 from being directly sandwiched and pressed against each other between the welding electrode bar 13a and the welding electrode 13b, and therefore the concentration of the welding current on the projection 12b is prevented. Thus, the projections 12a and 12b are welded to the bottom of the metal case 7 more evenly. When using the welding electrode 13c, the welding current flows through all the projections 12a and 12b approximately evenly even if the height of the central projection 12b is not set to be lower than those of the surrounding projections 12a. Therefore, the projections 12a and 12b are welded evenly to some extent.

Figure 6:
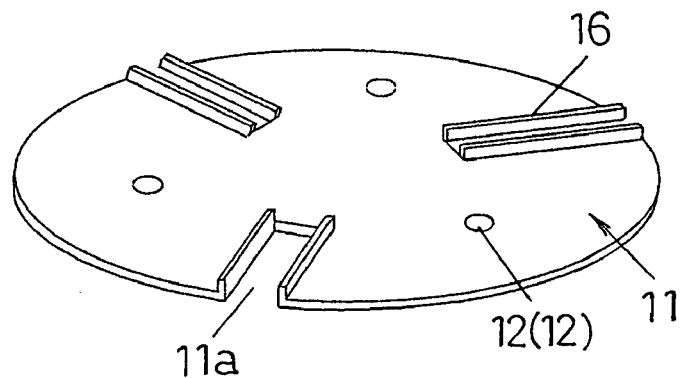
FIG. 6 is a perspective view of another negative electrode collector in the first embodiment.

In the above description, an example is described in which the projection 12b is provided at the center of the negative electrode collector 11, as shown in FIG. 2. Alternatively, only a plurality of projections 12a may be provided in the region between the center and the peripheral portion of the negative electrode collector 11 and the central projection 12b may be omitted, as shown in FIG. 6. In the example of FIG. 6, the slits 11a in the negative electrode collector 11 are formed in three directions. Thus, three projections 12a are provided at an angular interval of 120 degrees so as to respectively correspond to the slits 11a.

Figure 7:
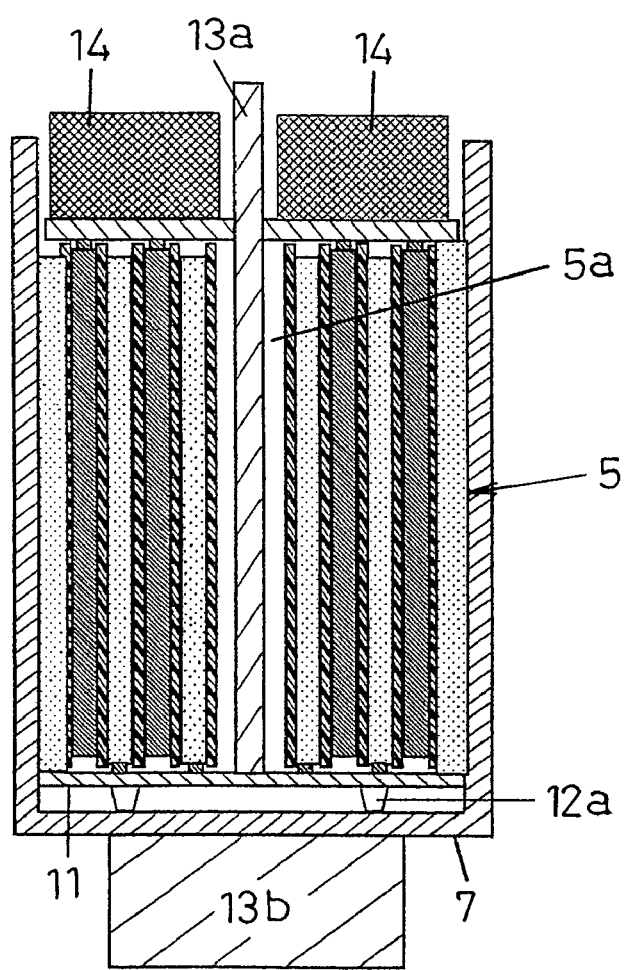
FIG. 7 is a longitudinal cross-sectional view showing a resistance welding process for welding the metal case and the other negative electrode collector to each other in the first embodiment.

In this case, the process for welding the projections 12a of the negative electrode collector 11 to the bottom of the metal case 7 is performed in the following manner. As shown in FIG. 7, a pressure is applied to the electrode plate assembly 5 by the pressing machine 14 with a required pressing force so as to bring the electrode plate assembly 5 into close contact with the bottom of the metal case 7. The welding electrode bar 13a is inserted into the through hole formed at the center of the positive electrode collector 10 and the hollow cylindrical portion 5a of the electrode plate assembly 5. One end of the welding electrode bar 13a is pressed against the center of the negative electrode collector 11 to be in contact with the center of the negative electrode collector 11. Moreover, the welding electrode 13b to be in contact with the bottom of the metal case 7 as a plane is brought into contact with the bottom of the metal case 7. In this state, a welding current is made to flow between the welding electrode bar 13a and the welding electrode 13b, thereby welding the plurality of projections 12a of the negative electrode collector 11 to the inner bottom surface of the metal case 7 at the same time by resistance welding.

Embodiment 2

Figure 8:
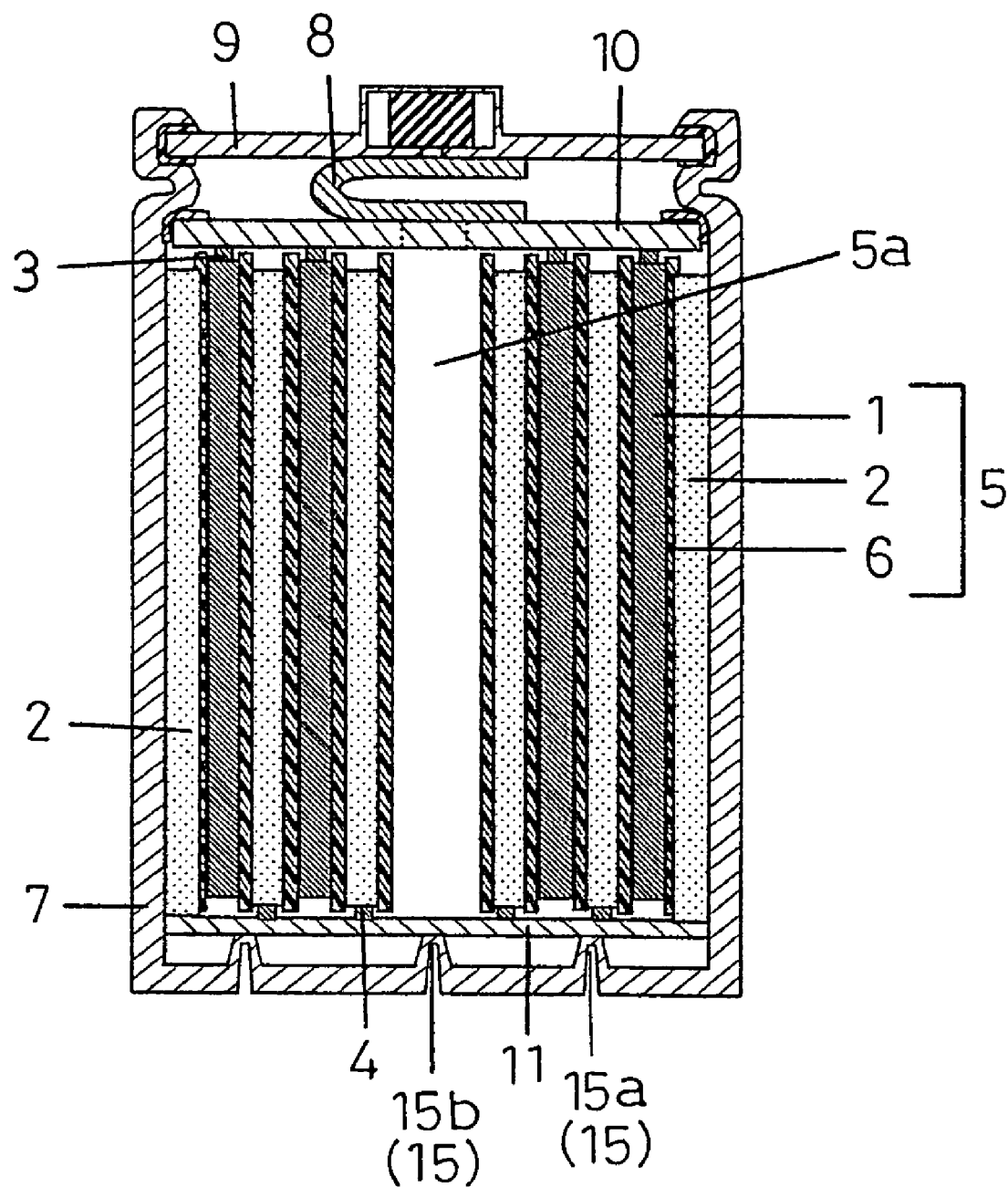
FIG. 8 is a longitudinal cross-sectional view of a cylindrical rechargeable battery according to a second embodiment of the present invention.
Figure 9:
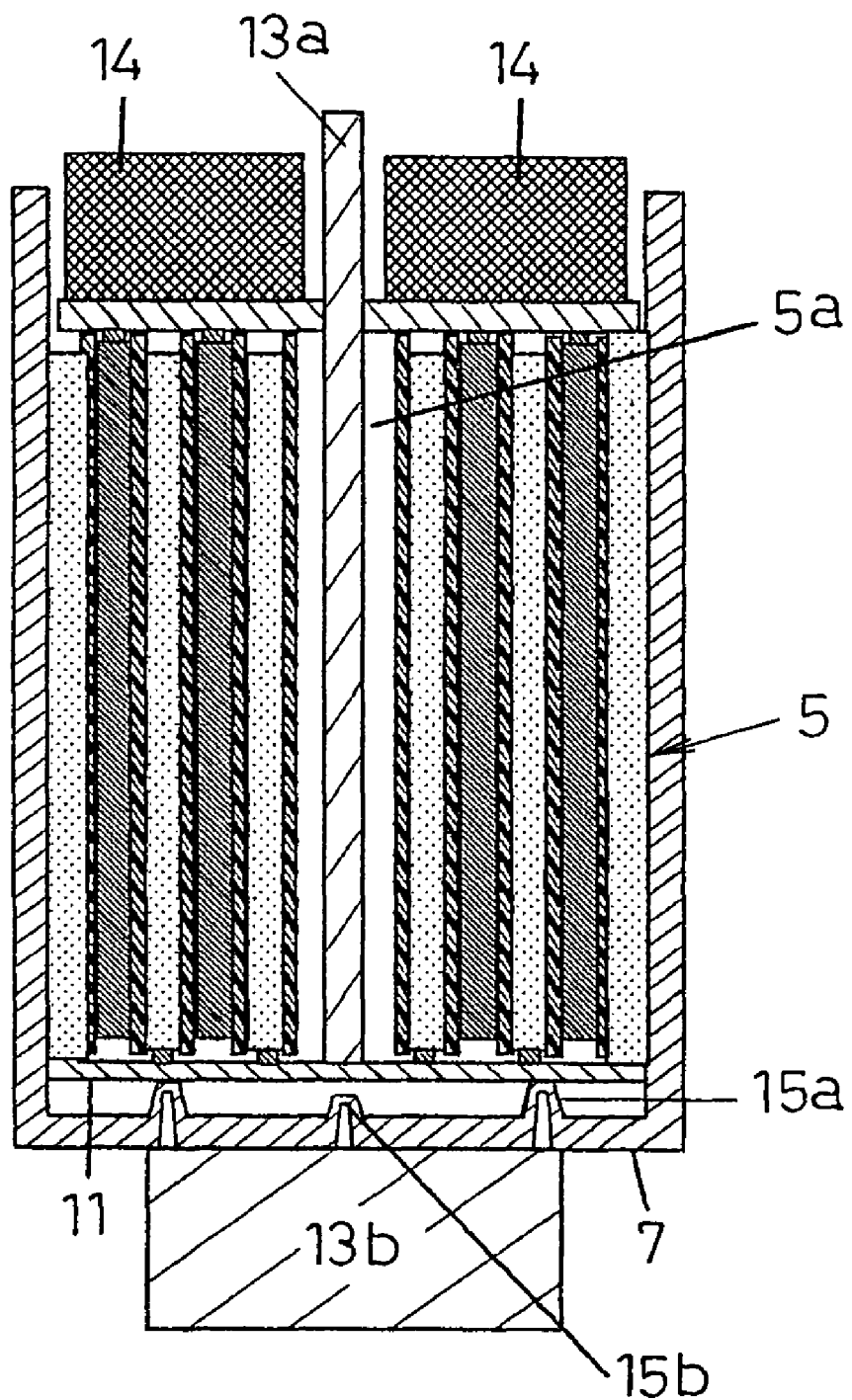
FIG. 9 is a longitudinal cross-sectional view showing a resistance welding process for welding a metal case and the negative electrode collector to each other in the second embodiment.
Figure 10:
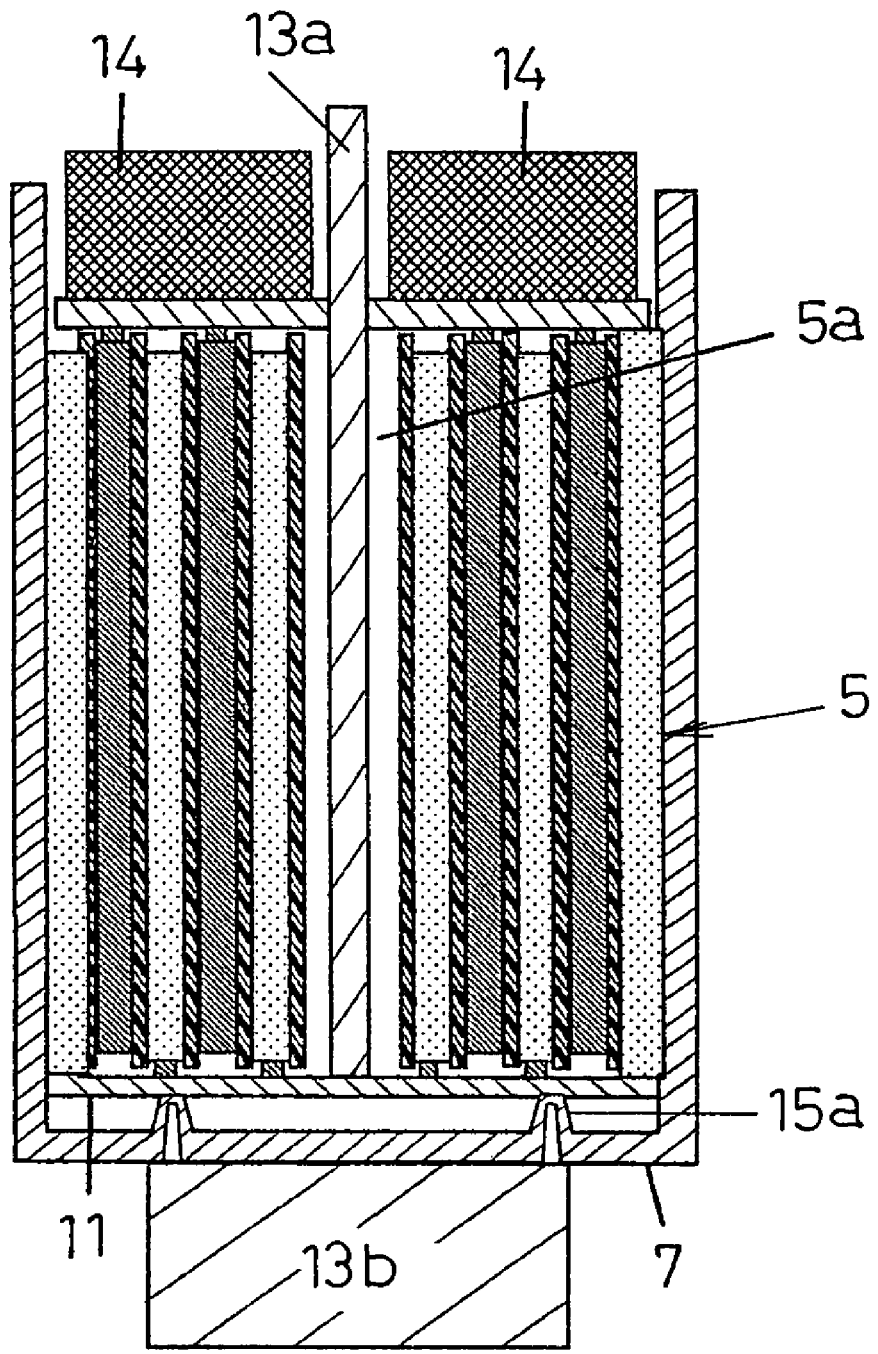
FIG. 10 is a longitudinal cross-sectional view showing a resistance welding process for welding another metal case and the negative electrode collector to each other in the second embodiment.

A cylindrical battery and a method for manufacturing the cylindrical battery according to a second embodiment of the present invention are described, with reference to FIGS. 8 to 10. The same components as those in the first embodiment are labeled with the same reference numerals as those in the first embodiment and the description thereof is omitted. That is, only a difference between the first and second embodiments is mainly described.

In the first embodiment, the projections 12a and 12b are provided on the lower surface of the negative electrode collector 11 and the negative electrode collector 11 is welded to the inner bottom surface of the metal case 7 via the projections 12a and 12b. However, in the present embodiment, projections 15 (15a and 15b) are provided on the inner bottom surface of the metal case 7 and are welded to the lower surface of the negative electrode collector 11 in the form of a flat surface.

In FIG. 8, a plurality of projections 15a projecting upward are formed on the bottom of the metal case 7 in a region between a portion opposed to the hollow cylindrical portion 5a of the electrode plate assembly 5 and the peripheral portion. One projection 15b projecting upward is also formed on the bottom of the metal case 7 at the portion opposed to the hollow cylindrical portion 5a of the electrode plate assembly 5. The plurality of projections 15a are arranged on the same circle at a regular angular interval. Before welding of the projections 15a and 15b to the lower surface of the negative electrode collector 11, the height of the central projection 15b is set to be lower than those of the projections 15a concentrically arranged. A height difference is set to be about 100 to about 500 μm, for example.

A process for welding the projections 15a and 15b on the bottom of the metal case 7 to the negative electrode collector 11 is described with reference to FIG. 9. In FIG. 9, a pressure is applied to the electrode plate assembly 5 by the pressing machine 14 with a required pressing force, thereby bringing the electrode plate assembly 5 into close contact with the bottom of the metal case 7. The welding electrode bar 13a is inserted into a through hole formed at the center of the positive electrode collector 10 and the hollow cylindrical portion 5a of the electrode plate assembly 5. One end of the welding electrode bar 13a is pressed against the center of the negative electrode collector 11 to be in contact with the center of the negative electrode collector 11. Moreover, the welding electrode 13b is arranged to be in contact with the bottom of the metal case 7. In this state, a welding current is made to flow between the welding electrode bar 13a and the welding electrode 13b, thereby welding the plurality of projections 15a and 15b provided on the bottom of the metal case 7 to the lower surface of the negative electrode collector 11 by resistance welding.

The height of the central projection 15b, which is located just below the welding electrode bar 13a and on which the pressing force directly acts and the welding current easily concentrates, is set to be lower than those of the plurality of surrounding projections 15a. That is, a gap is formed between the central projection 15b and the negative electrode collector 11. Thus, the welding current flows between the plurality of surrounding projections 15a and the negative electrode collector 11 in an initial stage of the above welding process. Therefore, top ends of the projections 15a are melted and welded to some extent, making resistance of the projections 15a during the flow of current smaller and reducing the heights of the projections 15a. Then, the welding current begins to flow through all the projections 15a and 15b approximately evenly at a time when the heights of the projections 15a become equal to that of the central projection 15b. Thus, it is possible to prevent concentration of the welding current on the central projection 15b only and insufficient welding of the plurality of surrounding projections 15a. That is, all the projections 15a and 15b are evenly welded to the negative electrode collector 11. In order to surely realize the above operation, it is preferable that each of the plurality of surrounding projections 15a taper down to a point in such a manner that its top end will be melted relatively easily to reduce its height.

In the example of FIGS. 8 and 9, the projection 15b is provided at the center of the bottom of the metal case 7. Alternatively, only the plurality of projections 15a may be provided in the region between the center and the peripheral portion of the bottom of the metal case 7 and the central projection 15b may be omitted, as shown in FIG. 10. In this case, a process for welding the projections 15a on the bottom of the metal case 7 to the negative electrode collector 11 is performed in the following manner. As shown in FIG. 10, a pressure is applied to the electrode plate assembly 5 by the pressing machine 14 with a required pressing force so as to bring the electrode plate assembly 5 into close contact with the bottom of the metal case 7. Then, the welding electrode bar 13a is inserted into the through hole formed at the center of the positive electrode collector 10 and the hollow cylindrical portion 5a of the electrode plate assembly 5. One end of the welding electrode bar 13a is pressed against the center of the negative electrode collector 11 so as to be in contact with the center of the negative electrode collector 11. Then, the welding electrode 13b to be in contact with the bottom of the metal case 7 as a plane is brought into contact with the bottom of the metal case 7. In this state, a welding current is made to flow between the welding electrode bar 13a and the welding electrode 13b, thereby welding the negative electrode collector 11 and the plurality of projections 15a provided on the inner bottom surface of the metal case 7 to each other at the same time by resistance welding.

Alternatively, in the welding process shown in FIG. 9, the welding electrode 13c that is to be in contact with the bottom of the metal case 7 in the form of a ring may be used as the welding electrode to be brought into contact with the bottom of the metal case 7, as in the example shown in FIG. 5 in the first embodiment, although an example using the welding electrode 13c is not shown. In this case, the same operation and effects are realized.

Example

A specific example of the present invention is now described. A cylindrical battery A of the present invention is a nickel metal hydride rechargeable battery having a diameter of 33 mm, a height of 61 mm, and a nominal capacitance of 6000 mAh. The structure of that cylindrical battery and a method for manufacturing that cylindrical battery are now described in detail.

The cylindrical battery A used a strip-like positive electrode plate of sintered nickel having a thickness of 0.5 mm and a strip-like negative electrode plate formed of hydrogen-absorption alloy having a thickness of 0.3 mm. Core materials of the positive electrode plate and the negative electrode plate were exposed at side ends in a width direction that were opposite to each other. A separator was interposed between the positive and negative electrode plates. The positive and negative electrode plates were arranged in such a manner that the exposed core materials of the positive and negative electrode plates project upward and downward by 1.5 mm, respectively. The positive and negative electrode plates were spirally wound entirely to form an electrode plate assembly having a diameter of 30 mm and a height of 50 mm.

A rectangular positive electrode collector having a diagonal length of 27 mm and a thickness of 400 μm was welded to the exposed portion of the core material at an upper end face of the electrode plate assembly. A circular negative electrode collector having a diameter of 27 mm and a thickness of 400 μm was welded to the exposed portion of the core material at a lower end face of the electrode plate assembly. The negative electrode collector had one projection X having a thickness of 300 μm at its center and four projections Y having a thickness of 500 μm arranged at a regular angular interval on the same circle away from the center by 15 mm.

This electrode plate assembly was inserted into a metal case. A pressing machine then pressed the electrode plate assembly and the metal case with a force of 200N, thereby bringing five projections of the negative electrode collector into close contact with the metal case. Then, one welding electrode bar was inserted into a central through hole of the positive electrode collector. A welding current of 4 kA was applied between the welding electrode bar and a welding electrode arranged under the metal case, thereby welding the five projections of the negative electrode collector to the inner bottom surface of the metal case. In order to make the welding current flow through the five projections evenly, it is desirable that the height of the central projection X be lower than those of the projections Y.

In this example, when welding was performed under a pressing condition in which the pressing force applied by the pressing machine was 50N or less, adhesion of the projections to the metal case was not complete. That is, one or more of the five projections was not welded in some cases. Moreover, when the pressing force was 400N or more, the projecting portion of the core material of the electrode plate assembly was bent so as to cause short-circuit between positive and negative electrodes in some cases. Furthermore, when the welding current was 1 kA or less, one or more of the projections was not welded in some cases. On the other hand, when the welding current was 6 kA or more, dust was scattered from the welding portion, thus causing short-circuit of the battery.

Next, a predetermined amount of alkaline electrolyte was poured into the metal case from the central through hole of the positive electrode collector. Then, an end of a connection lead provided on the positive electrode collector was welded to a sealing member serving as a positive electrode terminal and thereafter an opening of the metal case was sealed with the sealing member. In this manner, the cylindrical battery A of the present invention was manufactured.

A cylindrical battery B having no projection on the negative electrode collector was also manufactured in order to compare it with the cylindrical battery A.

Internal resistance was measured for each of the cylindrical batteries A and B and was compared between the batteries A and B. The battery was discharged at a current of 2 A at a room temperature (25° C.) until a battery voltage reached 0.9V, and thereafter the battery was charged at a current of 6 A for 30 minutes. Then, after a one-hour break, the battery was discharged at a current of 25 A for 20 seconds. After 10 seconds, the battery voltage was measured. Then, charge was performed by the amount of the discharged capacity and thereafter the battery was discharged at currents of 50 A, 75 A, and 100 A for 20 seconds. After 10 seconds, the battery voltage was measured. A slope of a straight line in I-V (current-voltage) characteristics was obtained, assuming that ordinate represented the thus obtained battery voltage after 10 seconds and abscissa represented the current value. The thus obtained straight lines are shown in FIG. 11.

Figure 11:
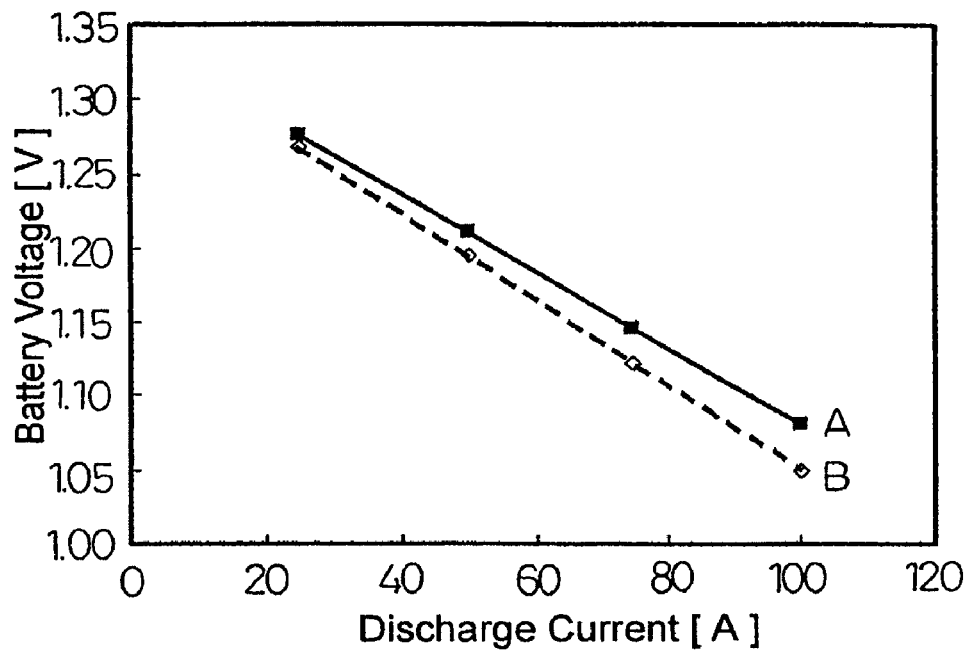
FIG. 11 a graph showing I-V (current-voltage) characteristics.
Figure 12:
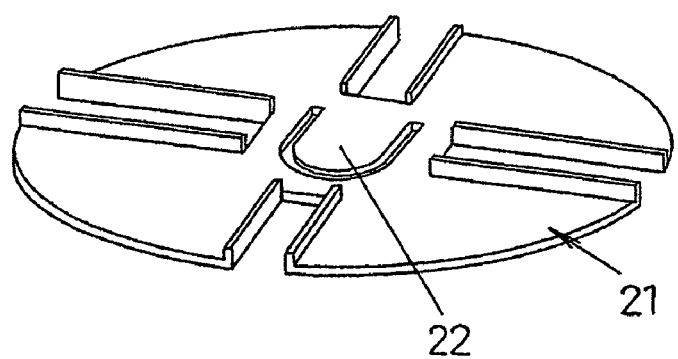
FIG. 12 is a perspective view of a negative electrode collector in a conventional cylindrical rechargeable battery.

As is apparent from FIG. 11, the slope of the straight line (i.e., the internal resistance) for the cylindrical battery B of Comparative Example was large, whereas the slope for the cylindrical battery A of the present invention was small. The internal resistance of the cylindrical battery B and that of the cylindrical battery A were 2.9 mΩ and 2.6 mΩ, respectively. That is, the internal resistance of the cylindrical battery A of the present invention was smaller than that of the cylindrical battery B of Comparative Example by 0.3 mΩ. This is because a large area of junction between the negative electrode collector and the metal case and a short path of a current flowing from the negative electrode collector to the metal case (negative electrode terminal) reduced the internal resistance and enabled high rate charge and discharge.

Table 1 shows a relationship between the internal pressure of the battery and expansion of the metal case. As is apparent from Table 1, the amount of expansion of the metal case with respect to the internal pressure in the battery A was half of that in the battery B. Therefore, a proof pressure of the metal case in the battery A was double as much as that in the battery B. This is because the bottom of the metal case of the battery A was integrated with the negative electrode collector as one unit by the five projections and therefore an effect similar to an effect of improving the pressure resistance obtained when the thickness of the bottom of the metal case was made thicker was obtained.

TABLE 1

| Internal pressure (MPa) | Amount of expansion of bottom of metal case (mm) | |
|---|---|---|
| | Battery A | Battery B |
| 1.0 | 0.1 | 0.2 |
| 2.0 | 0.3 | 0.7 |

INDUSTRIAL APPLICABILITY

As described above, according to a cylindrical battery of the present invention, a negative electrode collector and a metal case are welded to each other by resistance welding via a plurality of projections arranged on the negative electrode collector in a region between a center and a peripheral portion of the negative electrode collector. The center of the negative electrode collector is opposed to a hollow cylindrical portion of an electrode plate assembly. Thus, connection resistance is made small and internal resistance of the battery is reduced. Therefore, the battery is favorable when large current discharge is performed. Moreover, the strength of pressure resistance of a metal case are also increased. Accordingly, the present invention is especially suitable for a cylindrical battery for large current discharge.

The invention claimed is:

1. A method for manufacturing a cylindrical battery, comprising:
   forming an electrode plate assembly by depositing a positive electrode plate and a negative electrode plate with a separator interposed therebetween so that a first exposed portion of a core material provided at an end of a positive electrode plate in a width direction and a second exposed portion of the core material provided at an end of a negative electrode plate in a width direction protrude from the separator in directions opposite from each other in the width direction, and winding the positive electrode plate and the negative electrode plate with the separator interposed therebetween;
   welding a first collector to one of the first exposed portion and the second exposed portion of the core material;
   forming surrounding protrusions projecting downward on a second collector at a plurality of locations in a region between a first area opposed to a hollow cylindrical portion of the electrode plate assembly and a second area positioned at a periphery of a lower surface of the second collector;
   forming a central protrusion shorter in height than the surrounding protrusions at the first area;
   welding an upper surface of the second collector to the other of the first exposed portion and the second exposed portion of the core material;
   accommodating the electrode plate assembly in a metal case;
   welding the surrounding and central protrusions and the metal case to each other;
   pouring an electrolyte into the metal case; and
   sealing a top of the metal case with a sealing member having a cap that also serves as an input and output terminal, while the sealing member is electrically insulated from the metal case,
   wherein, during the welding of the surrounding and central protrusions and the metal case to each other, the electrode plate assembly and the metal case are brought into contact with each other by an application of pressure, and resistance welding is performed using a welding electrode bar inserted into the hollow cylindrical portion of the electrode plate assembly and a welding electrode brought into contact with a bottom of the metal case,
   wherein the pressure is within a range of 50 Newtons to 400 Newtons,
   wherein a welding current is within a range of 1 kA and 6 kA, and
   wherein the central protrusion is shorter in height than the surrounding protrusions by 100 µm to 500 µm.

2. A cylindrical battery manufactured by using the method according to claim 1.

3. A method for manufacturing a cylindrical battery, comprising:
   forming an electrode plate assembly by depositing a positive electrode plate and a negative electrode plate with a separator interposed therebetween so that a first exposed portion of a core material provided at an end of a positive electrode plate in a width direction and a second exposed portion of the core material provided at an end of a negative electrode plate in a width direction protrude from the separator in directions opposite from each other in the width direction, and winding the positive electrode plate and the negative electrode plate with the separator interposed therebetween;
   welding a first collector to one of the first exposed portion and the second exposed portion of the core material;
   forming surrounding protrusions projecting downward on a second collector at a plurality of locations in a region between a first area opposed to a hollow cylindrical portion of the electrode plate assembly and a second area positioned at a periphery of a lower surface of the second collector;
   forming a central protrusion shorter in height than the surrounding protrusions;
   welding an upper surface of the second collector to the other of the first exposed portion and the second exposed portion of the core material;
   accommodating the electrode plate assembly in a metal case;
   welding the surrounding and central protrusions and the metal case to each other;
   pouring an electrolyte into the metal case; and
   sealing a top of the metal case with a sealing member having a cap that also serves as an input and output terminal, while the sealing member is electrically insulated from the metal case,
   wherein, during the welding of the surrounding and central protrusions and the metal case to each other, the electrode plate assembly and the metal case are brought into contact with each other by an application of pressure, and resistance welding is performed using a welding electrode bar inserted into the hollow cylindrical portion of the electrode plate assembly and a ring-like welding electrode arranged in contact with portions on a bottom of the metal case corresponding to the surrounding protrusions,
   wherein the pressure is within a range of 50 Newtons to 400 Newtons,
   wherein a welding current is within a range of 1 kA and 6 kA, and
   wherein the central protrusion is shorter in height than the surrounding protrusions by 100 µm to 500 µm.

4. A cylindrical battery manufactured by using the method according to claim 3.

* * * * *